United States Patent [19]

Oudelaar

[11] 4,446,939

[45] May 8, 1984

[54] TILTCAB TRUCK WITH HYDRAULIC LOST MOTION

[75] Inventor: Tone Oudelaar, Oldenzaal, Netherlands

[73] Assignee: Applied Power Inc., Milwaukee, Wis.

[21] Appl. No.: 345,010

[22] Filed: Feb. 2, 1982

[51] Int. Cl.³ .......................................... B62D 33/06
[52] U.S. Cl. .................................. 180/89.15; 91/399
[58] Field of Search .............. 180/89.13, 89.14, 89.15, 180/89.16; 91/399, 400, 402; 92/DIG. 4

[56] References Cited

U.S. PATENT DOCUMENTS

| | | | |
|---|---|---|---|
| 3,831,999 | 8/1974 | Sonneborn | 92/DIG. 4 |
| 3,853,368 | 12/1974 | Eichelsheim | 180/89.15 |
| 3,972,557 | 8/1976 | Hudston et al. | 180/89.15 |
| 4,174,016 | 11/1979 | Levington et al. | 180/89.15 |
| 4,327,810 | 5/1982 | Jorda | 180/89.15 |

FOREIGN PATENT DOCUMENTS

| | | |
|---|---|---|
| 2458264 | 6/1975 | Fed. Rep. of Germany . |
| 2912093 | 3/1981 | Fed. Rep. of Germany . |
| 2945585 | 5/1981 | Fed. Rep. of Germany . |
| 2048383 | 12/1980 | United Kingdom . |
| 2055971 | 3/1981 | United Kingdom . |

Primary Examiner—Joseph F. Peters, Jr.
Assistant Examiner—Ross Weaver
Attorney, Agent, or Firm—John J. Byrne; Bradford E. Kile; Kevin M. O'Brien

[57] ABSTRACT

Disclosed is apparatus for permitting hydraulic lost motion between the push chamber and the pull chamber of the tilt cylinder(s) for a tiltcab truck. The apparatus comprises a pilot-operated check valve having a through passage (a) which is part of a hydraulic connection between the push chamber and the pull chamber and (b) which is only shut off when hydraulic pressure is applied to the push chamber(s) of the tilt cylinder(s).

22 Claims, 5 Drawing Figures

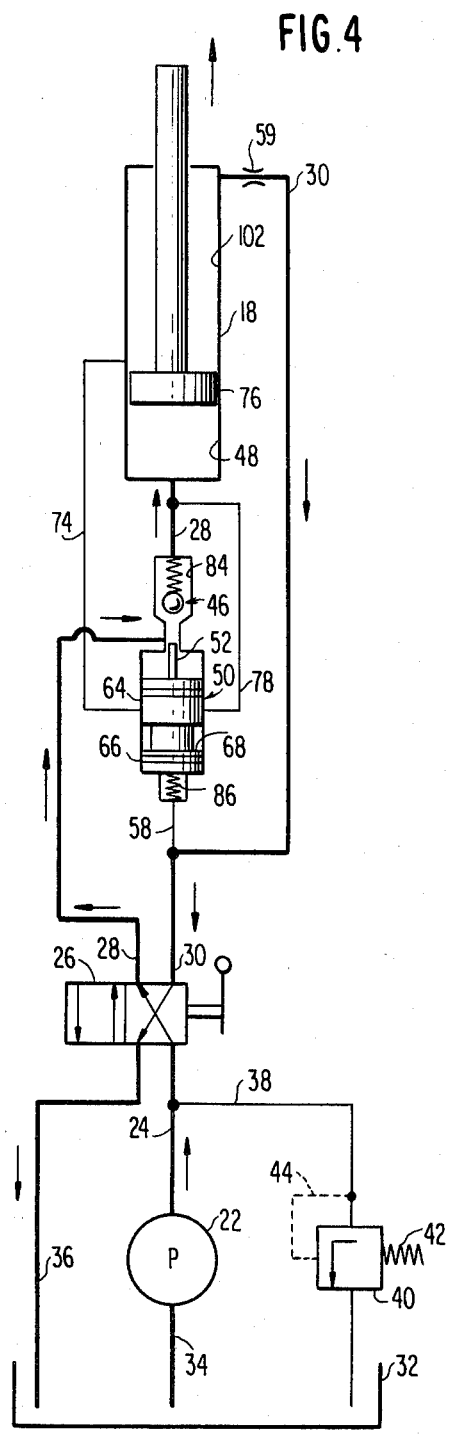
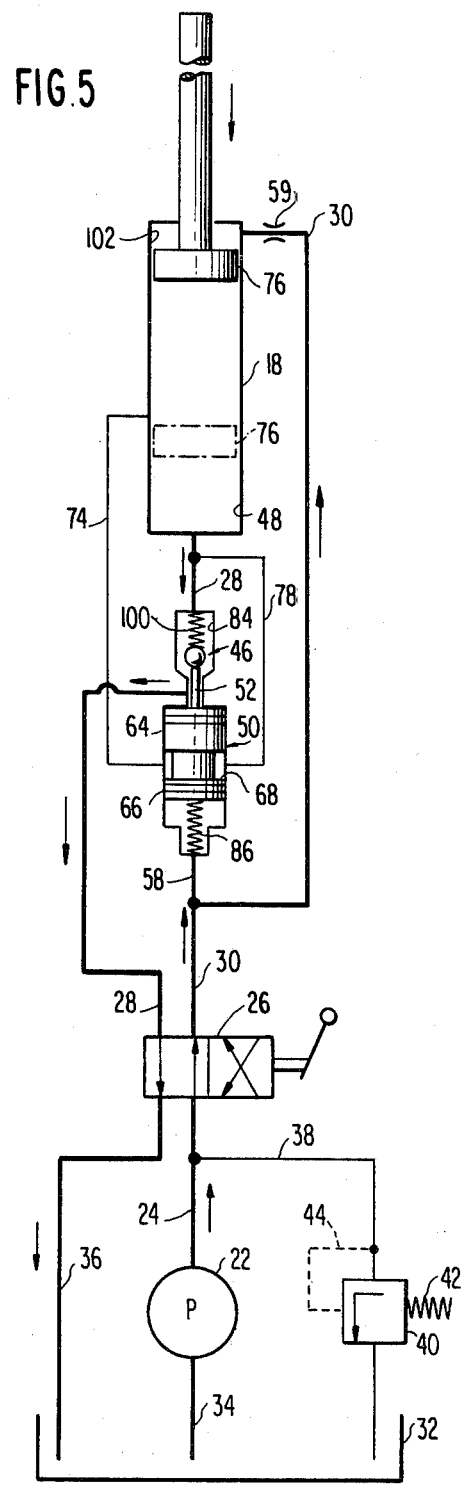

TILTCAB TRUCK WITH HYDRAULIC LOST MOTION

TECHNICAL FIELD

This invention relates to systems for tilting truck cabs relative to truck frames to expose truck motors for maintenance. In particular, it relates to such systems having hydraulic lost motion means for permitting hydraulic fluid to move back and forth between the push chamber and the pull chamber of the tilt cylinder(s) while the truck cabs are in their "over-the-road" position, thereby permitting the cabs to pivot relative to the frames to accomodate vertical motion in the suspension system.

BACKGROUND OF THE INVENTION

In the design of tiltcab trucks, it is desirable to provide a suspension system between the truck cab and the truck frame to partially isolate the occupants of the truck cab from vibration and jolts due to unevenness in the roads over which the truck passes. However, if the tilt cylinder(s) are connected directly to the cab frame and the truck frame, as is most convenient, the incompressible fluid in the push and pull chambers of the tilt cylinder(s) tends to hold the cab rigidly in position relative to the truck frame. This problem is conventionally overcome by providing hydraulic lost motion apparatus which permits hydraulic fluid to move back and forth between the push chambers and the pull chambers of the tilt cylinder(s) while the truck cabs are in their "over-the-road" position, thereby permitting the cabs to pivot relative to the frames to accomodate vertical motion in the suspension system. Examples of such apparatus are shown, for instance, in published United Kingdom patent application No. 2,048,383A and West German Off. No. 2,458,264.

BRIEF SUMMARY OF THE INVENTION

According to the subject invention, the apparatus for permitting hydraulic lost motion between the push chamber and the pull chamber of the tilt cylinder(s) comprises a pilot-operated check valve having a through passage (a) which is part of a hydraulic connection between the push chamber and the pull chamber and (b) which is only shut off when hydraulic pressure is applied to the push chamber of the tilt cylinder(s).

BRIEF DESCRIPTION OF THE DRAWINGS

FIG. 4 is a hydraulic schematic drawing showing the cab-tilting apparatus in the extension position.

FIG. 5 is a hydraulic schematic drawing showing the cab-tilting apparatus in the retraction position.

DETAILED DESCRIPTION OF A PREFERRED EMBODIMENT OF THE INVENTION

Figure 1:
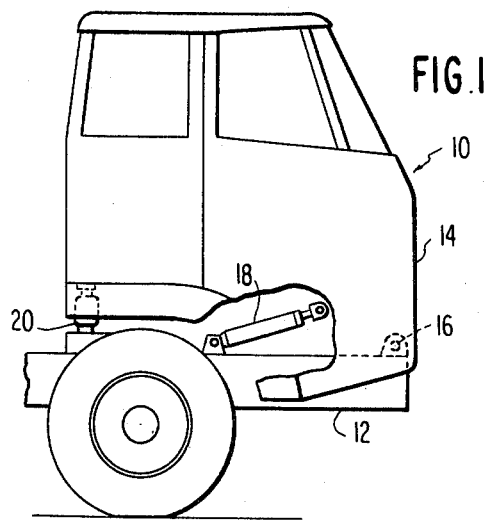
FIG. 1 is a schematic view of a tiltcab truck according to this invention with portions broken away to show the cab-tilting apparatus.

FIG. 1 shows a tiltcab truck 10 comprising a chassis member 12, a cab member 14 mounted on the chassis member 12 for pivotal movement about an axis 16 from the lowered first position shown in the drawing to a raised second position. One or more tilt cylinders 18 are operatively connected to the chassis member 12 and the cab member 14 to pivot the cab member 14 back and forth between its first and second positions. A suspension system 20 is operatively connected between the chassis member 12 and the cab member 14 to partially isolate the occupants of the cab member 14 from vibrations and jolts due to unevenness in the roads over which the truck 10 passes.

Figure 2:
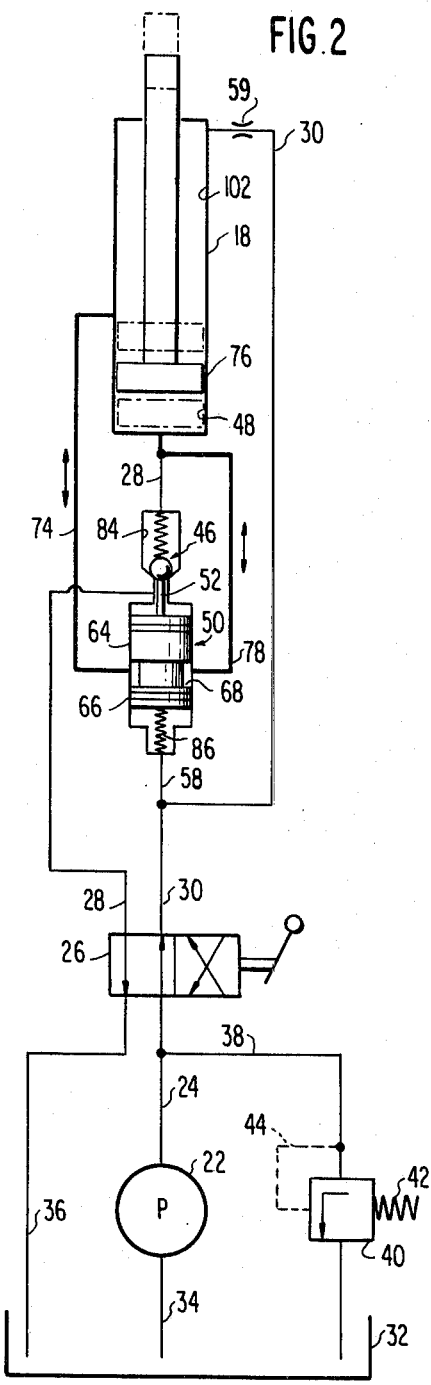
FIG. 2 is a hydraulic schematic drawing showing the cab-tilting apparatus in the over-the-road position.

Turning to FIGS. 2, 4, and 5, a pump 22 supplies hydraulic fluid under pressure to the tilt cylinder 18 via hydraulic conduit 24, control valve 26, and hydraulic conduits 28 and 30. The pump 22 obtains its hydraulic fluid from reservoir 32 via hydraulic conduit 34, and hydraulic fluid is returned to the reservoir 32 from the control valve 26 via hydraulic conduit 36.

A hydraulic conduit 38 containing a bypass valve 40 permits hydraulic fluid from the conduit 24 to return directly to the reservoir 32 when the pressure in the conduit 24 exceeds a predetermined minimum value. The bypass valve 40 is normally biased shut by a spring 42, but pressure in the conduit acting through a pressure tap 44 moves the bypass valve 40 to the right in FIGS. 2, 4, and 5 against the spring 42, ultimately allowing the hydraulic fluid to return to the reservoir 32 through the conduit 38.

A one-way valve 46 is located in the conduit 28 and oriented so as to be opened by hydraulic fluid under pressure flowing to the push chamber 48 of the tilt cylinder 18. A pilot piston 50 having a projection 52 sized, shaped, and positioned to open the one-way valve 46 under the influence of pilot pressure is located adjacent to the one-way valve 46.

Preferably, the one-way valve 46 and the pilot piston 50 are both located in a housing 54, and pilot pressure is supplied to a bore 56 in the housing 54 via a conduit 58 which branches off from the conduit 30. The conduit 58 is threadedly received in an axial port 60 in an end plug 62 which, in turn, is threadedly received in the housing 54.

Figure 3:
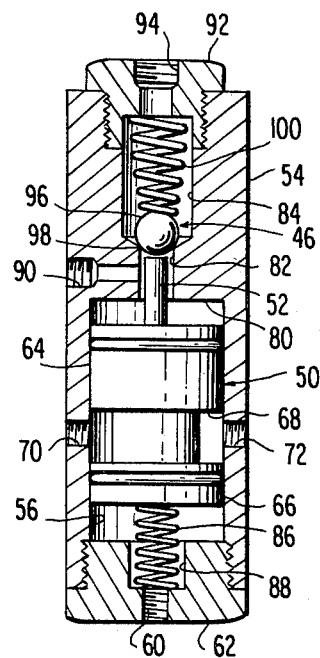
FIG. 3 is a cross-sectional view on an enlarged scale of the lost motion apparatus shown in FIG. 2.

The pilot piston 50 preferably comprises a spool having two pistons 64 and 66 which slide sealingly in the bore 56 and which are separated by an annular relief 68. Threaded radial ports 70 and 72 extend through the housing 54 in position to communicate with the relief 68 when the pilot piston 50 is in its central, or over-the-road, position (shown in FIGS. 2 and 3) and when it is in its retracting position (shown in FIG. 5). However, the radial ports 70 and 72 are blocked by the piston 64 when the pilot piston 50 is in its retracting position (shown in FIG. 4).

The radial port 70 threadedly receives a conduit 74 which communicates with the interior of the tilt cylinder 18 on the pull chamber side of the normal excursion of the tilt cylinder piston 76 due to unevenness in the road (symbolited by the two broken-line positions of the piston 76 in FIG. 2). The radial port 72 threadedly receives a conduit 78 which communicates with the conduit 28 between the one-way valve 46 and the push chamber 48.

The bore 56 ends in an abutment surface 80 which serves as one limit on the travel of the pilot piston 50. A smaller axial bore 82 extends through the abutment surface 80 and opens into a chamber 84 which contains the one-way valve 46. The projection 52 is biased to extend through the axial bore 82 and towards the one-way valve 46 by a spring 86 which extends between the piston 66 and the end plug 62, where it is received in a recess 88. The spring 86 can be entirely compressed into the recess 88, allowing the end plug 62 to serve as the other limit on the travel of the pilot piston 50.

A threaded radial port 90 extends through the housing 54 in position to communicate with the axial bore 82. The projection 52 is substantially smaller in diameter than the axial bore 82, permitting hydraulic fluid to flow through the radial port 90 and the axial bore 82 in both directions even when the projection 52 is in position to extend through the axial bore 82. The radial port 90 threadedly receives one portion of the conduit 28.

An end plug 92 is threadedly received in the housing 54 at the end opposite the end plug 62. The end plug 92 contains an axial port 94 which threadedly receives another portion of the conduit 28 and which leads to chamber 84. The one-way valve 46 comprises a ball 96 which valves the opening 98 between the axial bore 82 and the chamber 84 and a spring 100 which extends between the end plug 92 and the ball 96. The spring 100 is stronger than the spring 86, so that, in the absence of hydraulic pressure, the spring 100 holds the ball 96 in valving engagement with the opening 98 against the force from the spring 86 transmitted to the ball 96 via the projection 52.

OPERATION OF THE LOST-MOTION APPARATUS

When the truck 10 is travelling over the road, the tiltcab piston 76 has a central, at rest, position shown in solid lines, from which it moves irregularly in either direction, as suggested by the broken line position of the piston 76 and its rod. As the piston 76 moves down, it forces hydraulic fluid out of the push chamber 48, through a portion of the conduit 28, the conduit 78, the relief 68, and the conduit 74 to the pull chamber 102 above the piston 76. Passage of the hydraulic fluid through the conduit 28 beneath its connection with the conduit 78 is prevented by the one-way valve 46. As the piston 76 moves back up, it forces hydraulic fluid out of the pull chamber 102, through the conduit 74, the relief 68, the conduit 78, and the same portion of conduit 28 back to the push chamber 48. Again, passage of the hydraulic fluid through the conduit 78 is prevented by the one-way valve 46. While a small amount of pressure may be induced in the bore 56 beneath the piston 66, it is normally not enough to unseat the one-way valve 46, particularly since, as previously mentioned, the conduit 58 normally contains a pressure step-down transformer. In the unlikely event that the piston 76 moves upwardly enough to block the conduit 74, further lost-motion movement of the piston 76 is simply abruptly halted, and the piston 76 remains in position until it begins to sink back down towards its rest position.

Hydraulic fluid can flow back from the tilt cylinder 18 to the reservoir 32 during lost motion. This occurs when too much hydraulic fluid is present in the tilt cylinder 18. In that case, as the piston 76 moves down, a pressure builds up in the push chamber 48 which acts through the conduit 78, the relief 68, the conduit 74, the pull chamber 102, the conduit 30, and the conduit 58 to open the check valve 46. Once the check valve 46 has been opened, hydraulic fluid can flow back to the reservoir 32 through the conduit 28 until the consequent reduction in pressure in the push chamber 48 allows the check valve 46 to close.

FIG. 4 shows the cab-tilting apparatus in the extension position. In this position, hydraulic fluid from the reservoir 32 is pumped through the conduit 34, pump 22, the conduit 24, the control valve 26, a first portion of the conduit 28, and the port 90 to the axial bore 82 (where it moves the pilot piston 50 downwardly to its lower stop and where it unseats the one-way valve 46), through the chamber 84, the port 94, and a second portion of the conduit 28 to the push chamber 48, where it causes the tilt cylinder to extend. Outward motion of the tilt piston 76 causes hydraulic fluid to vacate the pull chamber 102 via the conduit 30, the control valve 26, and the conduit 36 to the reservoir 32. Passage of hydraulic fluid through the conduits 74 and 78 is prevented by the piston 64, which blocks the ports 70 and 72.

FIG. 5 shows the cab-tilting apparatus in the retraction position. In this position, hydraulic fluid from the reservoir 32 is pumped through the conduit 34, the pump 22, the conduit 24, the control valve 26, and the conduit 30 to the pull chamber 102, where it causes the tilt cylinder 18 to retract. Inward motion of the tilt piston 76 initially causes hydraulic fluid to vacate the push chamber 48 via the conduit 28, the chamber 84, the bore 82 (the one-way valve 46 having been unseated by the projection 52), the conduit 28 again, the control valve 26, and the conduit 36 to the reservoir 32. The pressure acting on the piston 66 via the conduit 58 is sufficient to move the pilot piston 50 upwards against the force of the spring 100 and the induced pressure in the chamber 84 because (1) it acts first, unseating the one-way valve 46, and, (2) once the one-way valve 46 is unseated, a hydraulic pathway is open all the way to the reservoir 32, preventing the induced pressure in the push chamber 48 from building up to a value high enough to move the pilot piston 50 downwards, allowing the one-way valve 46 to close under the combined urgings of the spring 100 and the induced pressure. However, the check valve 46 remains open only as long as the pressure remains in the conduit 58. This means that the cab 14 has to be pumped back all the way until the piston 76 passes the opening into the conduit 74. Passage of hydraulic fluid through the conduits 74 and 78 is prevented during a first stage of the retraction process because both are in communication with the push chamber 48 and during a second state of the retraction process because the conduit 74 is blocked by the piston 76.

Once the piston 76 has passed inwardly beyond the point where the conduit 74 is in communication with the interior of the tilt cylinder 18, however, a new stage is entered which has no analog during the extension of the tilt cylinder 18. In contrast to the situation during extension of the tilt cylinder 18, during which fluid flow through the conduits 74 and 78 is continuously prevented by the piston 64, flow through the conduits 74 and 78 is possible after the piston 76 has cleared the conduit 74 because the conduits 74 and 78 are both in communication with the relief 68. In this situation, the cab 14 falls freely to its rest position, since the weight of the cab 14 induces a pressure in push chamber 48 which acts through conduit 78, relief 68, conduit 74, pull chamber 102, conduit 30, and conduit 58 to open check valve 46. Once the check valve 46 is open, the hydraulic fluid flows freely back to the reservoir 32 through the conduit 28, the control valve 26, and the conduit 36.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

I claim:

1. In a motor vehicle comprising:
   (a) a chassis member;
   (b) a cab member mounted on said chassis member for pivotal movement about an axis transverse to the longitudinal axis of said chassis member from a lowered first position to a raised second position;
   (c) at least one tilt cylinder operatively connected to said chassis member and to said cab member to pivot said cab member back and forth between its first and second positions;
   (d) a pump for supplying hydraulic fluid under pressure to said tilt cylinders;
   (e) a reservoir for hydraulic fluid;
   (f) a suspension system between said chassis member and said cab member; and
   (g) first means for permitting hydraulic fluid to move back and forth between the push chamber and the pull chamber of said tilt cylinder while said cab member is in its first position, thereby permitting said cab member to pivot relative to said chassis member to accommmodate vertical motion in said suspension system, the improvement wherein said first means comprises a pilot-operated check valve having a through passageway which is a part of a hydraulic connection between the push chamber and the pull chamber of said tilt cylinder, which through passageway is only shut off when hydraulic pressure is applied to the push chamber of said tilt cylinder;

said pilot-operated check valve comprises a one-way valve and a pilot piston having a projection sized and shaped to open said one-way valve; and when hydraulic pressure is applied to the pull chamber of said tilt cylinder, said pilot piston is caused to open said one-way valve, but said through passageway remains open.

2. In a motor vehicle as recited in claim 1, the further improvement wherein said pilot-operated check valve further comprises a spring which maintains the projection on said pilot piston in contact with said one-way valve, but which is insufficiently strong to open said one-way valve.

3. In a motor vehicle comprising:
   (a) a chassis member;
   (b) a cab member mounted on said chassis member for pivotal movement about an axis transverse to the longitudinal axis of said chassis member from a lowered first position to a raised second position;
   (c) at least one tilt cylinder operatively connected to said chassis member and to said cab member to pivot said cab member back and forth between its first and second positions;
   (d) a pump for supplying hydraulic fluid under pressure to said tilt cylinders;
   (e) a reservoir for hydraulic fluid;
   (f) a suspension system between said chassis member and said cab member;
   (g) first means for permitting hydraulic fluid to move back and forth between the push chamber and the pull chamber of said tilt cylinder while said cab member is in its first position, thereby permitting said cab member to pivot relative to said chassis member to accomodate vertical motion in said suspension system;
   (h) a control valve for directing hydraulic fluid under pressure to either the push chamber or the pull chambers of said tilt cylinder and for directing returning hydraulic fluid to said reservoir from either the pull chamber or the push chamber of said tilt cylinder;
   (i) a first path of fluid communication from said control valve to the push chamber of said tilt cylinder; and
   (j) a second path of fluid communication from said control valve to the pull chamber of said tilt cylinder, the improvement wherein said first means comprises:
   (k) a one-way valve located in said first path of fluid communication and oriented so as to be opened by hydraulic fluid under pressure flowing to the push chamber of said tilt cylinder;
   (l) a pilot piston having a projection sized, shaped, and positioned to open said one-way valve under the influence of pilot pressure;
   (m) a third path of fluid communication for pilot pressure from said second path of fluid communication to said pilot piston; and
   (n) a fourth path of fluid communication from the push chamber to the pull chamber of said tilt cylinder, said fourth path of fluid communication including a passage through said pilot piston which is only shut off when hydraulic pressure is applied to the push chamber of said tilt cylinder.

4. In a motor vehicle as recited in claim 3, the further improvement wherein said pilot piston is sized and shaped so that, when hydraulic pressure is applied to the pull chamber of said tilt cylinder via said second path of fluid communication, pilot pressure conducted to said pilot piston via said third path of fluid communication causes the projection on said pilot piston to open said one-way valve, but the passage in said fourth path of fluid communication through said pilot piston remains open.

5. In a motor vehicle as recited in claims 3 or 4, the further improvement wherein:
   (a) said pilot piston comprises a spool having two pistons separated by an annular relief and
   (b) the passage through said pilot piston comprises the annular relief between the piston surfaces.

6. In a motor vehicle as recited in claim 5, the further improvement wherein said first means further comprises a spring which biases the projection on said pilot piston towards said one-way valve, but which is insufficiently strong to open said one-way valve.

7. In a motor vehicle as recited in claims 3 or 4, the further improvement wherein said first means further comprises a spring which biases the projection on said pilot piston towards said one-way valve, but which is insufficiently strong to open said one-way valve.

8. A motor vehicle comprising:
   (a) a chassis member;
   (b) a cab member mounted on said chassis member for pivotal movement about an axis transverse to the longitudinal axis of said chassis member from a lowered first position to a raised second position;
   (c) at least one tilt cylinder operatively connected to said chassis member and to said cab member to pivot said cab member back and forth between its first and second positions;

(d) a pump for supplying hydraulic fluid under pressure to said tilt cylinders;
(e) a reservoir for hydraulic fluid;
(f) a suspension system between said chassis member and said cam member; and
(g) first means for permitting hydraulic fluid to move back and forth between the push chamber and the pull chamber of said tilt cylinder while said cab member is in its first position, thereby permitting said cab member to pivot relative to said chassis member to accommodate vertical motion in said suspension system, said first means comprising a pilot-operated check valve having a through passageway which is part of a hydraulic connection between the push chamber and the pull chamber of said tilt cylinder, which through passageway is only shut off when hydraulic pressure is applied to the push chamber of said tilt cylinder;
said pilot-operated check valve comprises a one-way valve and a pilot piston having a projection sized and shaped to open said one-way valve; and
when hydraulic pressure is applied to the pull chamber of said tilt cylinder, said pilot piston is caused to open said one-way valve, but said through passageway remains open.

9. A motor vehicle as recited in claim 8, wherein said pilot-operated check valve further comprises a spring which maintains the projection on said pilot piston in contact with said one-way valve, but which is insufficiently strong to open said one-way valve.

10. A motor vehicle comprising:
(a) a chassis member;
(b) a cab member mounted on said chassis member for pivotal movement about an axis transverse to the longitudinal axis of said chassis member from a lowered first position to a raised second position;
(c) at least one tilt cylinder operatively connected to said chassis member and to said cab member to pivot said cab member back and forth between its first and second positions;
(d) a pump for supplying hydraulic fluid under pressure to said tilt cylinders;
(e) a reservoir for hydraulic fluid;
(f) a suspension system between said chassis member and said cab member;
(g) a control valve for directing hydraulic fluid under pressure to either the push chamber or the pull chambers of said tilt cylinder and for directing returning hydraulic fluid to said reservoir from either the pull chamber or the push chamber of said tilt cylinder;
(h) a first path of fluid communication from said control valve to the push chamber of said tilt cylinder;
(i) a second path of fluid communication from said control valve to the pull chamber of said tilt cylinder;
(j) a one-way valve located in said first path of fluid communication and oriented so as to be opened by hydraulic fluid under pressure flowing to the push chamber of said tilt cylinder;
(k) a pilot piston having a projection sized, shaped, and positioned to open said one-way valve under the influence of pilot pressure;
(l) a third path of fluid communication for pilot pressure from said second path of fluid communication to said pilot piston; and
(m) a fourth path of fluid communication from the push chamber to the pull chamber of said tilt cylinder, said fourth path of fluid communication including a passage through said pilot piston which is only shut off when hydraulic pressure is applied to the push chamber of said tilt cylinder.

11. A motor vehicle as recited in claim 10, wherein said pilot piston is sized and shaped so that, when hydraulic pressure is applied to the pull chamber of said tilt cylinder via said second path of fluid communication, pilot pressure conducted to said pilot piston via said third path of fluid communication causes the projection on said pilot piston to open said one-way valve, but the passage in said fourth path of fluid communication through said pilot piston remains open.

12. A motor vehicle as recited in claims 10 or 11, wherein:
(a) said pilot piston comprises a spool having two pistons separated by an annular relief and
(b) the passage through said pilot piston comprises the annular relief between the piston surfaces.

13. A motor vehicle as recited in claim 12, and further comprising a spring which biases the projection on said pilot piston towards said one-way valve, but which is insufficiently strong to open said one-way valve.

14. A motor vehicle as recited in claims 10 or 11, and further comprising a spring which biases the projection on said pilot piston towards said one-way valve, but which is insufficiently strong to open said one-way valve.

15. Apparatus for permitting hydraulic fluid to move back and forth between the push chamber and the pull chamber of a tilt cylinder on a tiltcab truck, said apparatus comprising a pilot-operated check valve having a through passage which is part of a hydraulic connection between the push chamber and the pull chamber of the tilt cylinder, which through passage is only shut off when hydraulic pressure is applied to the push chamber of the tilt cylinder, said pilot-operated check valve comprising,
a one-way valve;
a pilot piston having a projection sized and shaped to open said one-way valve; and
means for applying hydraulic fluid under pressure to said pilot piston, thereby causing it to open said one-way valve.

16. Apparatus as recited in claim 15 wherein said through passageway remains open when the projection on said pilot piston has opened said one-way valve.

17. Apparatus as recited in claim 16 wherein said pilot-operated check valve further comprises a spring which biases the projection on said pilot piston towards said one-way valve, but which is insufficiently strong to open said one-way valve.

18. Apparatus for permitting hydraulic fluid to move back and forth between the push chamber and the pull chamber of a tilt cylinder on a tiltcab truck, said apparatus comprising:
(a) a one-way valve adapted to be located in a conduit for communicating hydraulic fluid under pressure to the push chamber of the tilt cylinder and to be oriented so as to be opened by hydraulic fluid under pressure flowing to the push chamber;
(b) a pilot piston having a projection sized, shaped, and positioned to open said one-way valve under the influence of pilot pressure; and
(c) a passage through said pilot piston which is adapted to be connected so as to form part of a hydraulic connection between the push chamber and the pull chamber, said passage being sized and shaped so that it is only shut off when the projection on said pilot piston has been moved out of engagement with said one-way valve.

19. Apparatus as recited in claim 18 wherein said pilot piston is sized and shaped so that, when pilot pressure causes the projection on said pilot piston to open said one-way valve, the passage through said pilot piston remains open.

20. Apparatus as recited in claims 18 or 19 wherein:
   (a) said pilot piston comprises a spool having two piston surfaces separated by an annular relief and
   (b) the passage through said pilot piston comprises the annular relief between the piston surfaces.

21. Apparatus as recited in claim 20 and further comprising a spring which biases the projection on said pilot piston towards said one-way valve, but which is insufficiently strong to open said one-way valve.

22. Apparatus as recited in claims 18 or 19 and further comprising a spring which biases the projection on said pilot piston towards said one-way valve, but which is insufficiently strong to open said one-way valve.

* * * * *